(12) United States Patent
Keilwert et al.

(10) Patent No.: US 11,354,969 B2
(45) Date of Patent: Jun. 7, 2022

(54) TOUCH INPUT PREDICTION USING GESTURE INPUT AT GAMING DEVICES, AND RELATED DEVICES, SYSTEMS, AND METHODS

(71) Applicant: IGT, Las Vegas, NV (US)

(72) Inventors: Stefan Keilwert, St. Josef (AT); Sven Aurich, Schwanberg (AT); Michael Russ, Graz (AT); David Froy, Jr., Lakeville-Westmorland (CA)

(73) Assignee: IGT, Las Vegas, NV (US)

( * ) Notice: Subject to any disclaimer, the term of this patent is extended or adjusted under 35 U.S.C. 154(b) by 110 days.

(21) Appl. No.: 16/723,002

(22) Filed: Dec. 20, 2019

(65) Prior Publication Data

US 2021/0192886 A1   Jun. 24, 2021

(51) Int. Cl.
| | | |
|---|---|---|
| *G06F 3/041* | (2006.01) | |
| *G06F 3/044* | (2006.01) | |
| *G06F 3/045* | (2006.01) | |
| *G07F 17/32* | (2006.01) | |
| *G06F 3/01* | (2006.01) | |
| *G06F 3/04883* | (2022.01) | |
| *G07F 17/34* | (2006.01) | |

(52) U.S. Cl.
CPC .......... *G07F 17/3209* (2013.01); *G06F 3/017* (2013.01); *G06F 3/0416* (2013.01); *G06F 3/04883* (2013.01); *G07F 17/323* (2013.01); *G07F 17/3213* (2013.01); *G07F 17/3227* (2013.01); *G07F 17/3244* (2013.01); *G07F 17/3239* (2013.01); *G07F 17/3293* (2013.01); *G07F 17/34* (2013.01)

(58) Field of Classification Search
CPC . G06F 2203/04101; G06F 2203/04106; G06F 2203/04808; G06F 3/0425; G07F 17/3206; G07F 17/3209
See application file for complete search history.

(56) References Cited

U.S. PATENT DOCUMENTS

| | | | |
|---|---|---|---|
| 8,062,115 B2 | 11/2011 | Thomas et al. | |
| 8,959,459 B2 | 2/2015 | Aoki et al. | |
| 10,198,904 B2 | 2/2019 | Froy et al. | |
| 10,564,770 B1* | 2/2020 | Keeler | G06F 3/0418 |
| 2011/0175832 A1* | 7/2011 | Miyazawa | G06F 3/041 345/173 |
| 2012/0108337 A1 | 5/2012 | Kelly et al. | |

(Continued)

*Primary Examiner* — Lawrence S Galka
(74) *Attorney, Agent, or Firm* — Sage Patent Group

(57) ABSTRACT

A gaming device, and related devices, methods, and systems, may include a touch input device to detect touch inputs performed by a user, and a gesture input device to detect gesture inputs performed by the user. The gaming device may further includes a processor circuit and a memory coupled to the processor circuit. The memory may include machine-readable instructions that, when executed by the processor circuit, cause the processor circuit to: receive a first gesture input value from the gesture input device, predict, based on the first gesture input value, a predicted touch input value corresponding to a predicted touch input that is predicted to be performed by the user, and modify a user interface element of the gaming device based on the first gesture input value and the predicted touch input value.

20 Claims, 15 Drawing Sheets

(56) References Cited

U.S. PATENT DOCUMENTS

| | | | |
|---|---|---|---|
| 2012/0169646 A1* | 7/2012 | Berkes | G06F 3/0488 |
| | | | 345/174 |
| 2013/0120319 A1* | 5/2013 | Givon | G06F 3/0425 |
| | | | 345/175 |
| 2014/0191996 A1* | 7/2014 | Hwang | G06F 3/041 |
| | | | 345/173 |
| 2015/0123929 A1* | 5/2015 | Bang | G06F 3/0488 |
| | | | 345/173 |
| 2015/0134572 A1* | 5/2015 | Forlines | G06F 3/0488 |
| | | | 706/11 |
| 2016/0188112 A1* | 6/2016 | Forlines | G06N 5/04 |
| | | | 345/173 |
| 2017/0028295 A1 | 2/2017 | Patton et al. | |
| 2017/0192617 A1* | 7/2017 | Barth | G06K 9/00375 |
| 2018/0130283 A1 | 5/2018 | Froy et al. | |

* cited by examiner

900

Detect, by a gesture input device of a gaming device, a first gesture by a user of the gaming device
902

Generate, by the gesture input device, a first gesture input value based on the first gesture
904

Based on the first gesture input value, predict, by a processor circuit of the gaming device, a predicted touch input that is predicted to be performed by the user
906

Generate, by the processor circuit, a predicted touch input value based on the predicted touch input
908

Modify a user interface element of the gaming device based on the first gesture input value and the predicted touch input value.
910

*FIG. 9A*

TOUCH INPUT PREDICTION USING GESTURE INPUT AT GAMING DEVICES, AND RELATED DEVICES, SYSTEMS, AND METHODS

BACKGROUND

Embodiments described herein relate to providing input at gaming devices, and in particular to predicting touch inputs at gaming devices using gesture input, and related devices, systems, and methods.

Gaming devices, such as electronic gaming machines (EGMs) in a casino environment, may provide input devices for facilitating play of a game by a player at the gaming device, and for providing additional interactive functionality at the gaming device. Many conventional gaming devices employ relatively simple input devices, such as buttons or keypads, which limit the features and functionality that can be offered at the gaming device.

BRIEF SUMMARY

According to an embodiment, a gaming device includes a touch input device to detect touch inputs performed by a user, and a gesture input device to detect gesture inputs performed by the user. The gaming device further includes a processor circuit and a memory coupled to the processor circuit. The memory includes machine-readable instructions that, when executed by the processor circuit, cause the processor circuit to receive a first gesture input value from the gesture input device. The instructions further cause the processor circuit to predict, based on the first gesture input value, a predicted touch input value corresponding to a predicted touch input that is predicted to be performed by the user. The instructions further cause the processor circuit to modify a user interface element of the gaming device based on the first gesture input value and the predicted touch input value.

According to another embodiment, a method includes detecting, by a gesture input device of a gaming device, a first gesture by a user of the gaming device. The method further includes generating, by the gesture input device, a first gesture input value based on the first gesture. The method further includes, based on the first gesture input value, predicting, by a processor circuit of the gaming device, a predicted touch input that is predicted to be performed by the user. The method further includes generating, by the processor circuit, a predicted touch input value based on the predicted touch input. The method further includes modifying a user interface element of the gaming device based on the first gesture input value and the predicted touch input value.

According to another embodiment, a system includes a processor circuit and a memory coupled to the processor circuit. The memory includes machine-readable instructions that, when executed by the processor circuit, cause a gesture input device of a gaming device to detect a first gesture by a user of the gaming device, and generate a first gesture input value based on the first gesture. The instructions further cause the processor circuit to receive the first gesture input value from the gesture input device. The instructions further cause the processor circuit to predict, based on the first gesture input value, a predicted touch input value corresponding to a predicted touch input that is predicted to be performed by the user. The instructions further cause the processor circuit to modify a user interface element of the gaming device based on the first gesture input value and the predicted touch input value.

BRIEF DESCRIPTION OF SEVERAL VIEWS OF THE DRAWINGS

FIGS. 9A-9C are flowcharts illustrating operations of systems/methods according to some embodiments.

DETAILED DESCRIPTION

Figure 1:
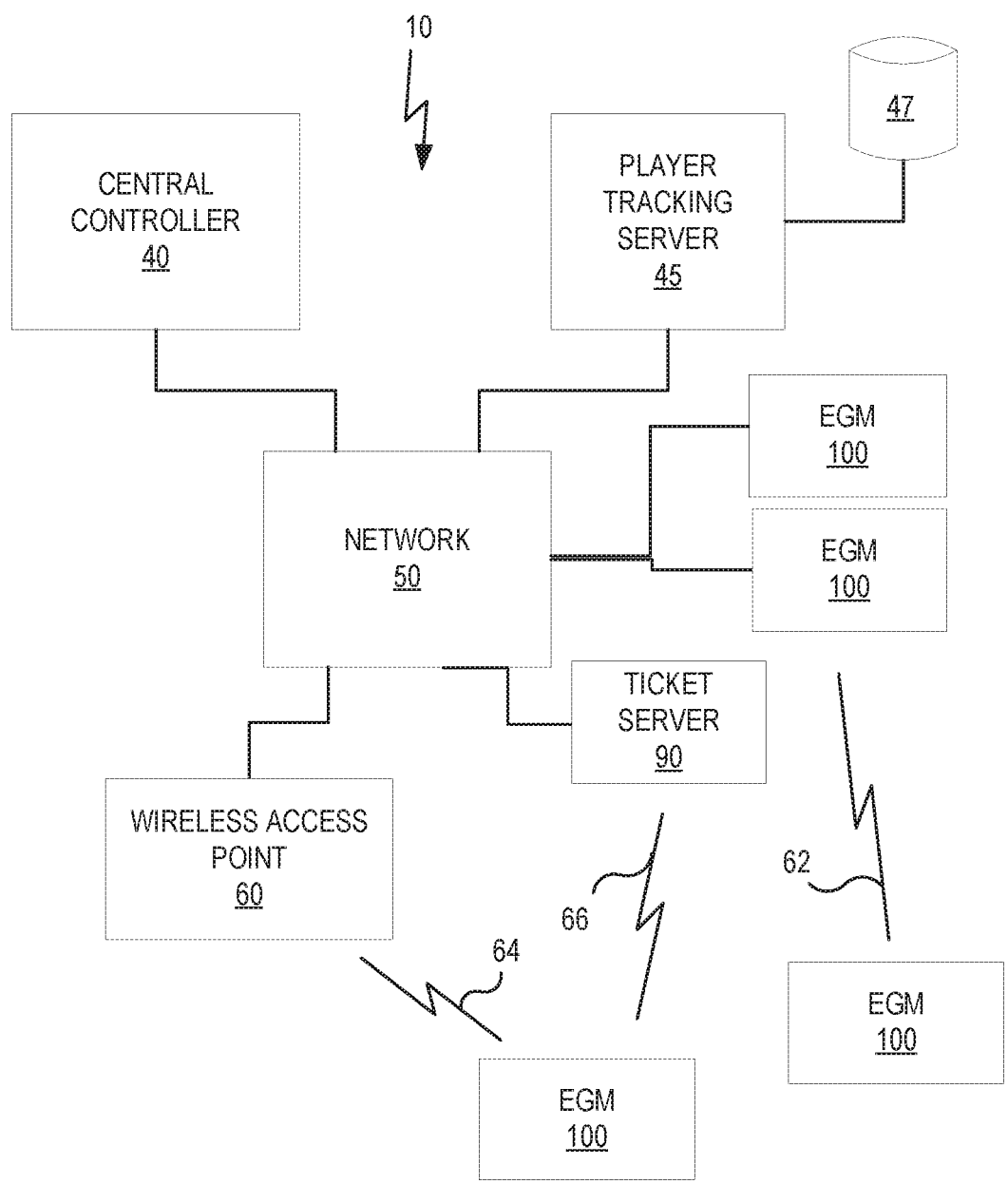
FIG. 1 is a schematic block diagram illustrating a network configuration for a plurality of gaming devices according to some embodiments.

Touch input functionality is widely used throughout the gaming industry, such as through touchscreens and other touch input devices. By using gesture sensors and other types of input devices to detect movement, gestures, or other types of non-contact inputs proximate to the touch input device, touch inputs and other types of contact inputs may be predicted before they occur, thereby enabling new ways for players to interact with the gaming devices.

In some embodiments, hand-tracking data may be generated by gesture input devices to predict a player interaction with a touchscreen interface of a gaming device. For example, a player's hand or a held object may be recognized in front of a gaming device via visual or non-visual technologies. Velocity, acceleration, and direction of movement may also be determined and analyzed in addition to position, which may be used to estimate and/or predict a player's interaction intentions and derive concrete actions, such as modifying user interface elements of the gaming device, to improve and modify the game's content and user interfaces. In some embodiments, the gaming device may calculate a predicted time and location for a predicted touch input and may dynamically modify and/or optimize game content (e.g., graphics, sound, light, etc.) based on the predicted touch input.

Other examples include modifying a game icon in a game chooser based on a predicted selection by the player, or highlighting a user interface element based on a prediction that the player will select a different element. A sound may also play based on a predicted touch input, and may stop or change if the player does not provide the predicted touch input. It may also be detected when a player is pointing at a particular element for a period of time without touching the element, which may trigger additional actions by the gaming device.

In another example, a gaming device may recognize a player's intent to leave the gaming device by detecting movement toward a cashout button. In response, the gaming device may encourage the player to remain at the gaming device. The encouragement may be direct, e.g., by providing a message with an offer in exchange for continuing to play, or indirect, e.g., by generating a mysterious sound or visual effect before the player presses the cashout button, which may generate curiosity or interest from the player. According to another embodiment, the game may provide hints or provide positive or negative feedback based on a prediction that a player will make a particular game decision. If a touch input is not received within a predetermined amount of time, the game may also indicate that a touch input is required to proceed. This functionality also provides another way for operators to detect a malfunction in the touchscreen interface. In another embodiment, the gaming device may reveal a portion of a hidden prize before the player makes a selection. A cross-fade or other user interface transition may begin prior to the touch input to more smoothly transition between user interface elements.

Additional examples include providing a pop-up options menu in response to predicting that the player will touch an options icon, which may make it easier to select small user interface elements, such as on a mobile device. In another example, a magnifying function may magnify or zoom in on elements of the user interface prior to touching the screen to allow more accurate and precise touch inputs. Open up tool box menu (prior to touching, show which options are available). In this manner, these and other embodiments provide unique technical solutions to the technical problems and challenges of providing more responsive game play and functionality at gaming devices.

Referring to FIG. 1, a gaming system 10 including a plurality of gaming devices 100 is illustrated. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Gaming Devices

Figure 2A:
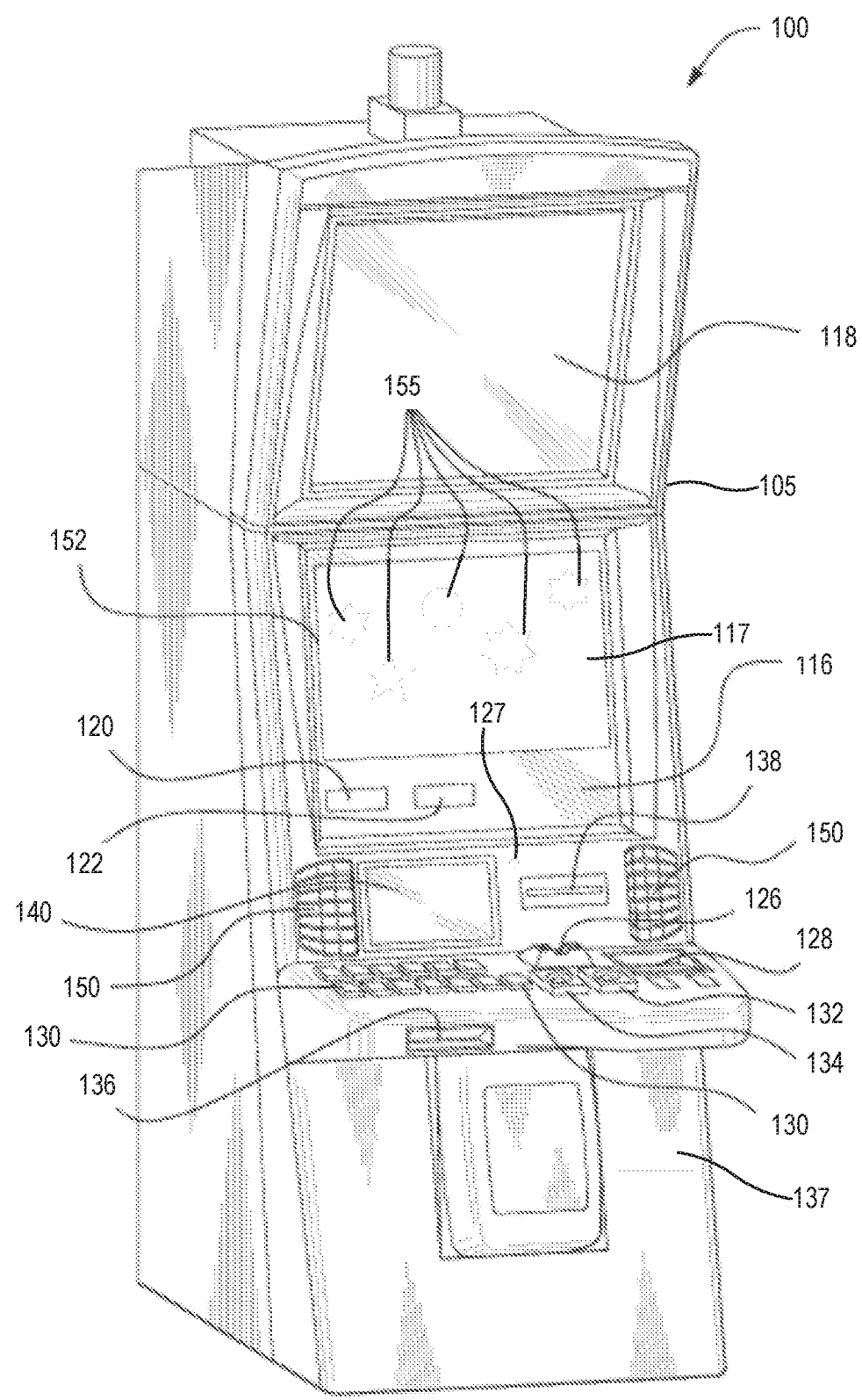
FIG. 2A is a perspective view of a gaming device that can be configured according to some embodiments.
Figure 2B:
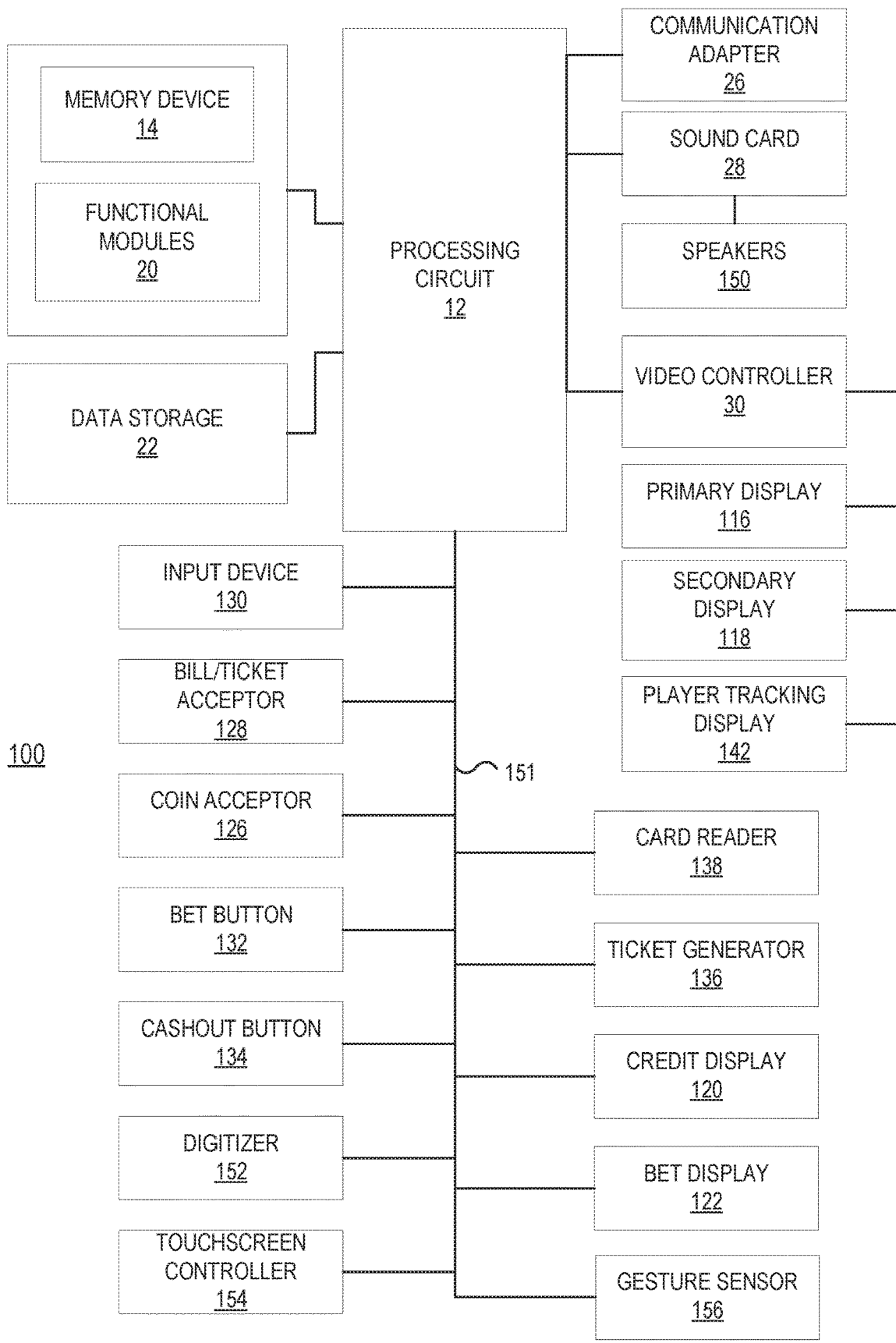
FIG. 2B is a schematic block diagram illustrating an electronic configuration for a gaming device according to some embodiments.
Figure 2C:
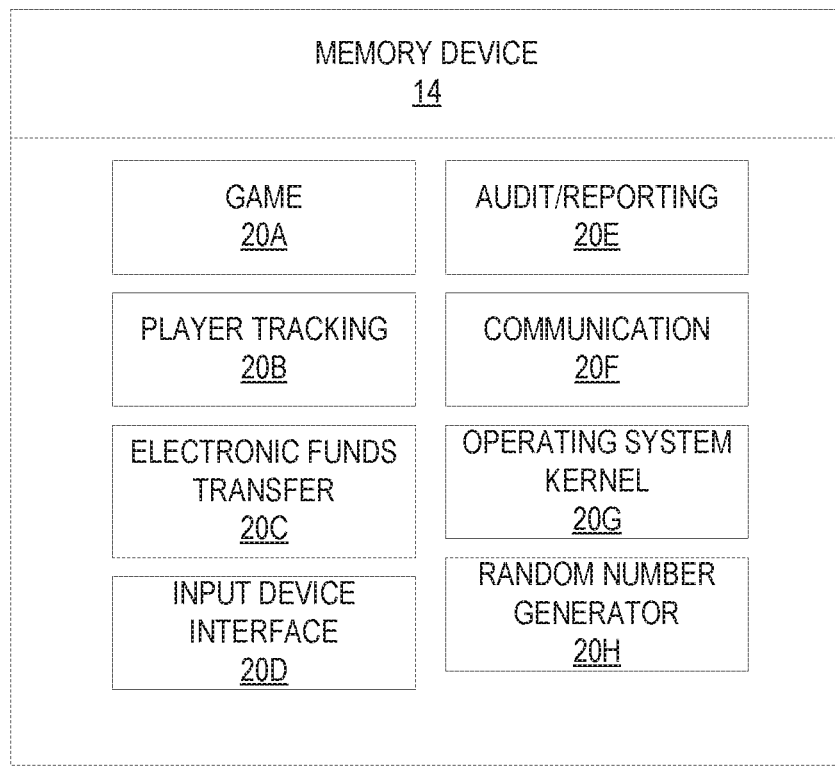
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 comprises a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
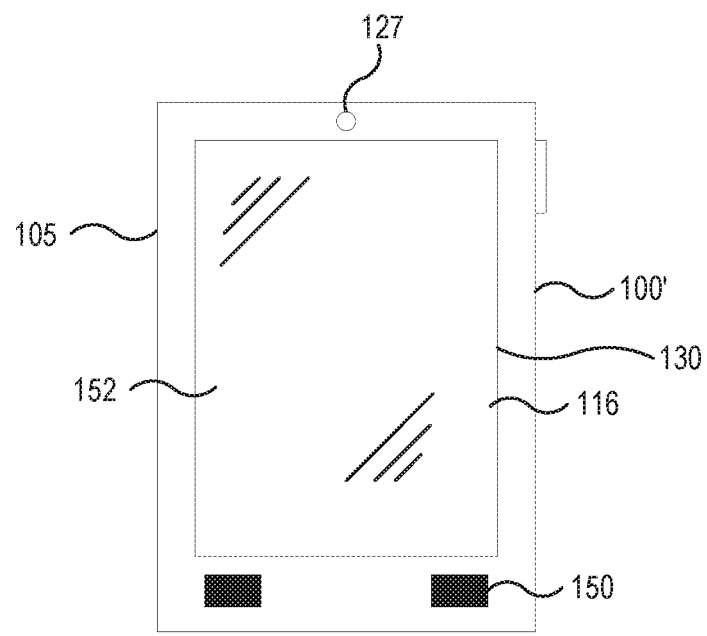
FIG. 2D is perspective view of a gaming device that can be configured according to some embodiments.

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
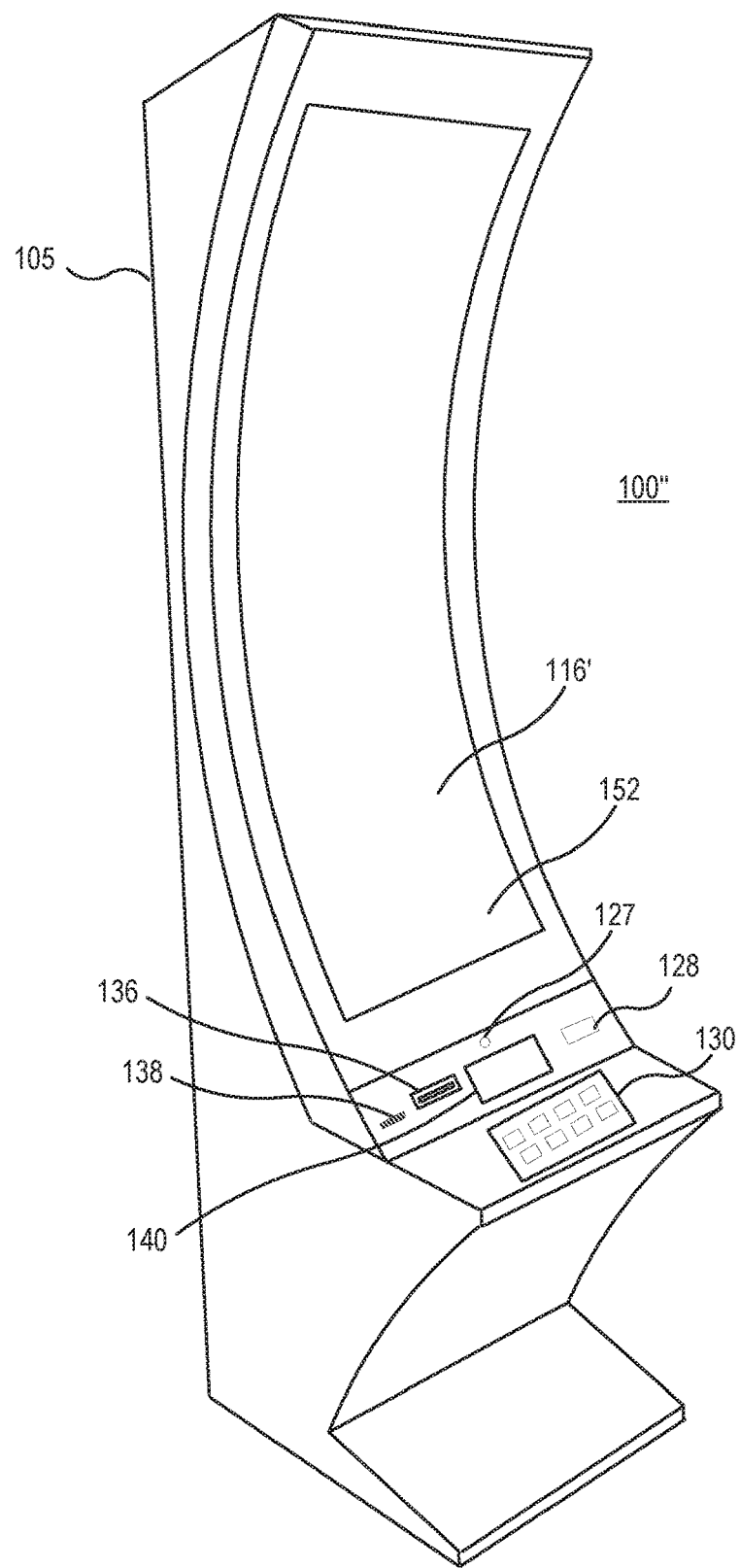
FIG. 2E is a perspective view of a gaming device according to further embodiments.

FIG. 2E illustrates a standalone gaming device 100" having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Input Device Features

Figure 3:
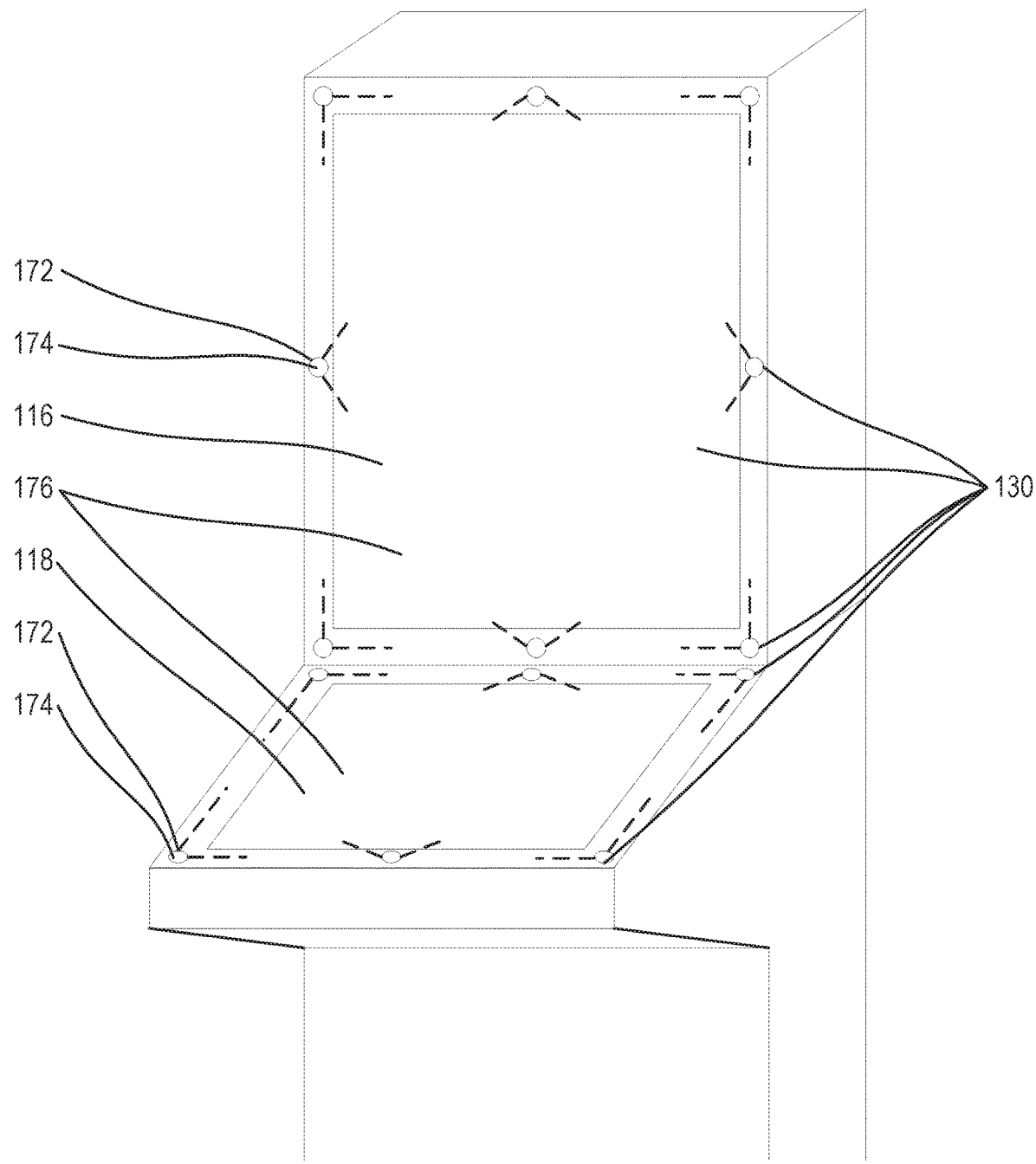
FIG. 3 is a diagram of a gaming device having gesture and touch input devices to detect player gesture and touch inputs associated with the gaming device, according to an embodiment.

Referring now to FIG. 3, a gaming device 100 having a plurality of input devices 130 is illustrated according to an embodiment. In this embodiment, the input devices 130 include gesture input devices 172 including a plurality of gesture sensors 174 to detect player gestures associated with the gaming device 100. The input devices 130 also include touchscreen input devices 176 for detecting touch input at the display devices 116, 118.

The gesture sensors 174 are arranged around the primary display device 116 and the secondary display device 118 in order to detect gestures associated with user interface elements of the display devices 116, 118. For example, each gesture sensor 174 may provide a gesture input value corresponding to the gesture performed by the player. The gesture sensors 174 may include ultrasonic sensors, optical (e.g., infrared) sensors, image capture devices, and/or other suitable sensors for detecting gestures associated with the gaming device 100. In some embodiments, the gesture input sensors may include three dimensional (3D) gesture input sensors to detect a 3D gesture performed by the player, with each 3D gesture input sensor providing a 3D gesture input value corresponding to the 3D gesture performed by the player.

Other Gaming Device Features

Embodiments described herein may be implemented in various configurations for gaming devices 100s, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Figure 4B:
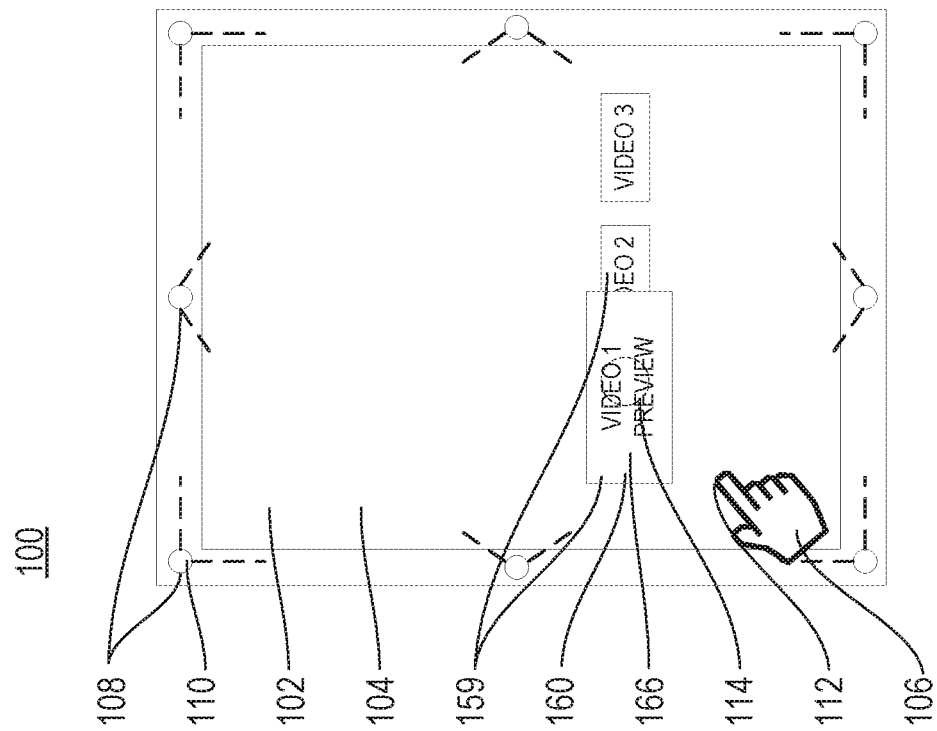
FIGS. 4A-4D are diagrams illustrating operation of gesture and touch input devices to modify user interface elements, according to some embodiments.
Figure 4A:
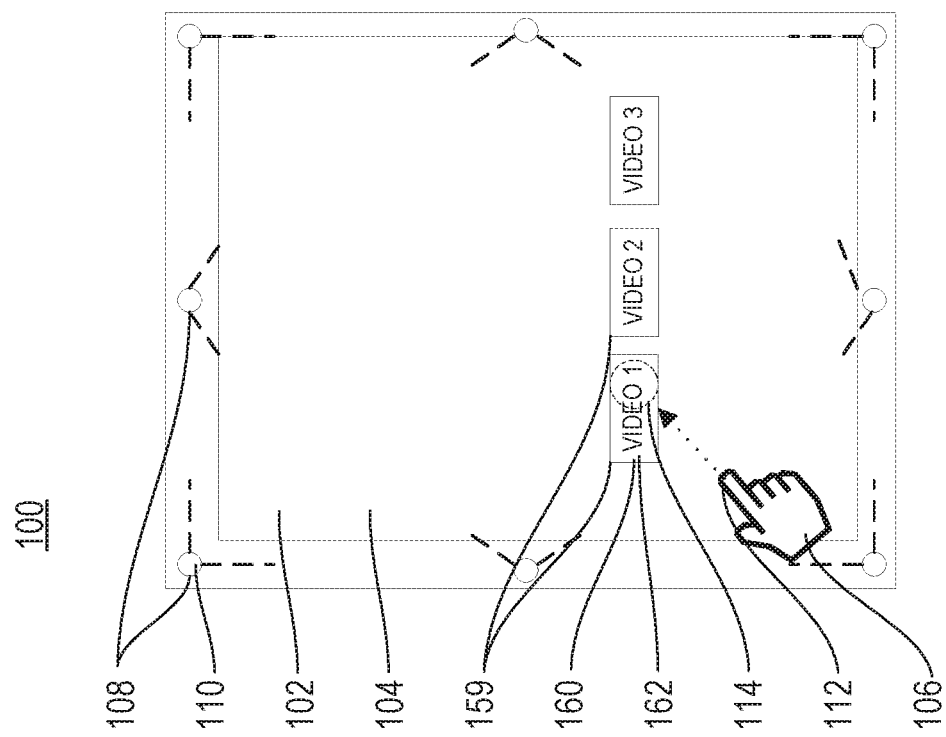

FIGS. 4A-4D are diagrams illustrating operation of the gesture and touch input devices of FIG. 3 to modify user interface elements, according to some embodiments. As shown in FIG. 4A, the gaming device 100 includes a touch input device 102 (e.g., a touchscreen 104) to detect touch inputs performed by a user 106, and a plurality of gesture input devices 108 (e.g., image capture devices 110) to detect gesture inputs performed by the user 106. In this example, the gesture input devices 108 detect gesture inputs by the user 106 (e.g., gestures by the user's finger 112, hand 113, or other body part, etc.) and generate gesture input values based on the detected gesture inputs. Each gesture input value may include a position value corresponding to a current position of the user's finger 112, a velocity value corresponding to a current velocity of the finger 112, a direction value corresponding to a current direction of travel of the finger 112, an acceleration value corresponding to an instant acceleration of the finger 112 in the current direction of travel of the finger 112, and/or other values corresponding to other aspects of the gesture.

A processor circuit of the gaming device 100 (or another device in communication with the gaming device 100) predicts touch inputs to be performed by the user 106 based on the gesture input values. For example, a gesture input value may indicate that the user's finger 112 is moving toward a particular location 114 on the touchscreen. Based on this gesture input value, the processor circuit may predict that the user's finger 112 will perform a touch input at that location 114, and may generate a predicted touch input value corresponding to the predicted touch input. For example, the predicted touch input can be determined (and/or the predicted touch input value generated) based on the position value, the velocity value, the direction value, the acceleration value, and/or other values.

In some embodiments, determining the predicted touch input value may include a predicted position value corresponding to a predicted position of the predicted touch input, and/or a predicted time value corresponding to a predicted time of the predicted touch input. The predicted position value and/or the predicted time value may be determined based on the position value, the velocity value, the direction value, the acceleration value, and or other values, as desired. The predicted touch input value may also be determined based on the predicted position value, predicted time value, and/or other values, as desired.

The predicted touch input value may further be based on a previously received touch input. For example, the processor circuit may correlate a gesture input value with a previously received touch input that was performed following a similar detected gesture by the user 106 or another user. Based on the correlation, the predicted touch input may be determined to correspond to the previously received touch input.

In the embodiment of FIGS. 4A and 4B, the processor circuit may modify a user interface element 159 (e.g., a graphical user interface element 160) of the gaming device 100, on the first gesture input value and the predicted touch input value. In this embodiment, the user interface element 159 is modified before the user 106 performs the predicted touch input. For example, before the user performs the predicted touch input, the graphical user interface element 160 may be modified to draw the user's attention to the graphical user interface element 160. In the embodiment of FIGS. 4A-4D, the predicted touch input include a selection 162 of a video program 164 (see FIG. 4C). As shown in FIG. 4B, before the user 106 performs the predicted touch input, a video preview 166 for the video program 164 is displayed on the touchscreen 104 or another display device. It should be understood that other types of user interface elements 159 may be modified as well, such as audio user interface elements (e.g., sounds, music, etc.), haptic user interface elements (e.g., force feedback, vibration, etc.), or other types of user interface elements 159, as an alternative to or in addition to graphical user interface elements 160.

Figure 4D:
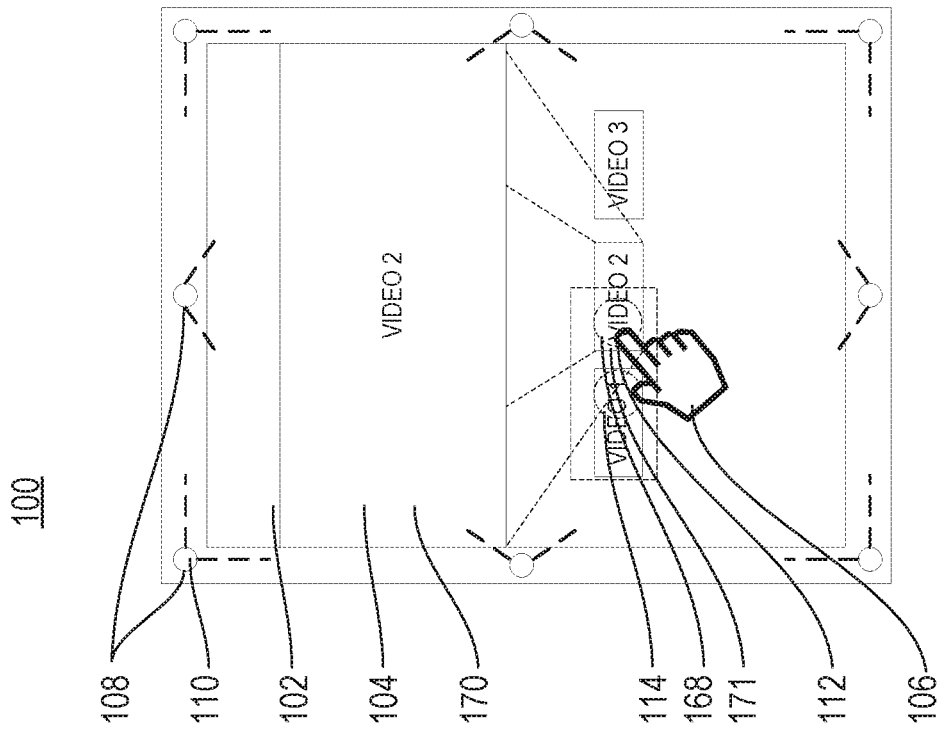
Figure 4C:
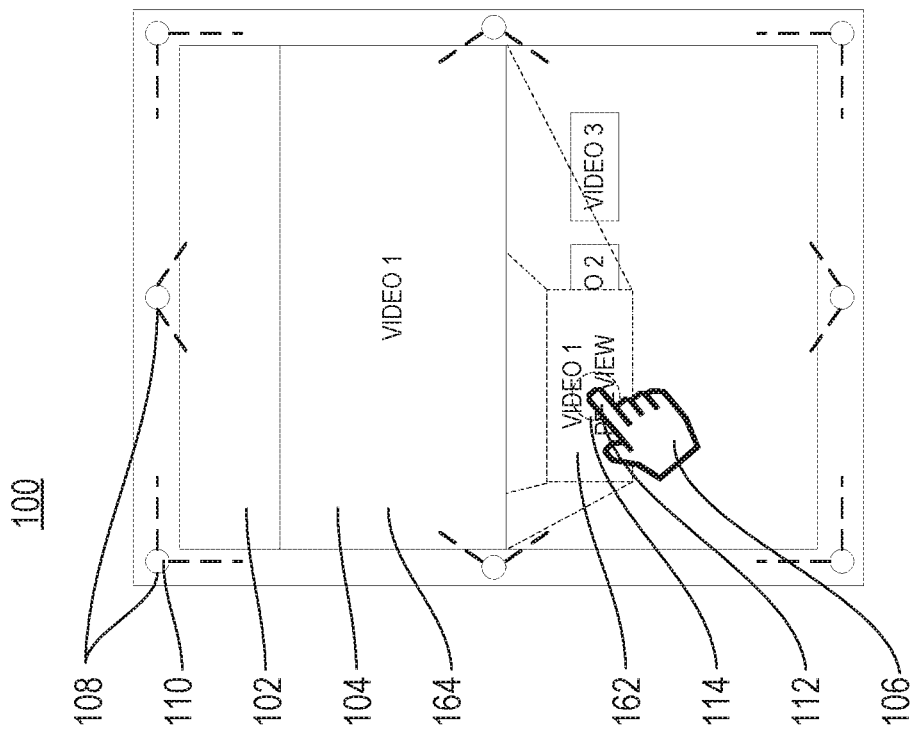

Referring now to FIG. 4C, the modified graphical user interface element 160 or other user interface elements 159 may be further modified in response to the user 106 performing the predicted touch input. For example, in response to the user 106 performing the predicted touch input at the predicted touch input location 114 and/or time, the video program 164 associated with the selection 162 at the touch input location 114 may be displayed.

Referring now to FIG. 4D, the modified graphical user interface element 160 or other user interface elements 159 may be further modified in response to the user 106 performing a touch input different from the predicted touch input. For example, in response to the user 106 performing the predicted touch input at a touch input location 168 that is different from the predicted touch input location 114 and/or time, the video preview 166 for the video program 164 may stop, and/or a different video program 170 associated with a different selection 171 at the different touch input location 168 may start instead.

Figure 5B:
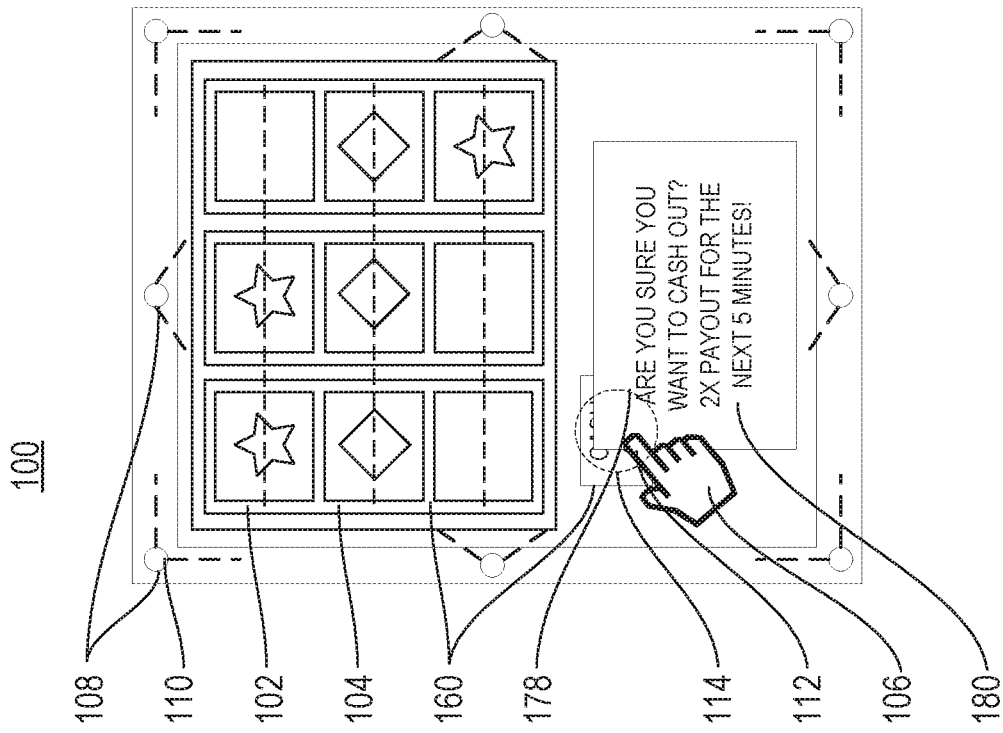
FIGS. 5A and 5B are diagrams illustrating operation of the gesture and touch input devices of FIGS. 4A-4D to display a message to a player before activating a cashout function, according to some embodiments.
Figure 5A:
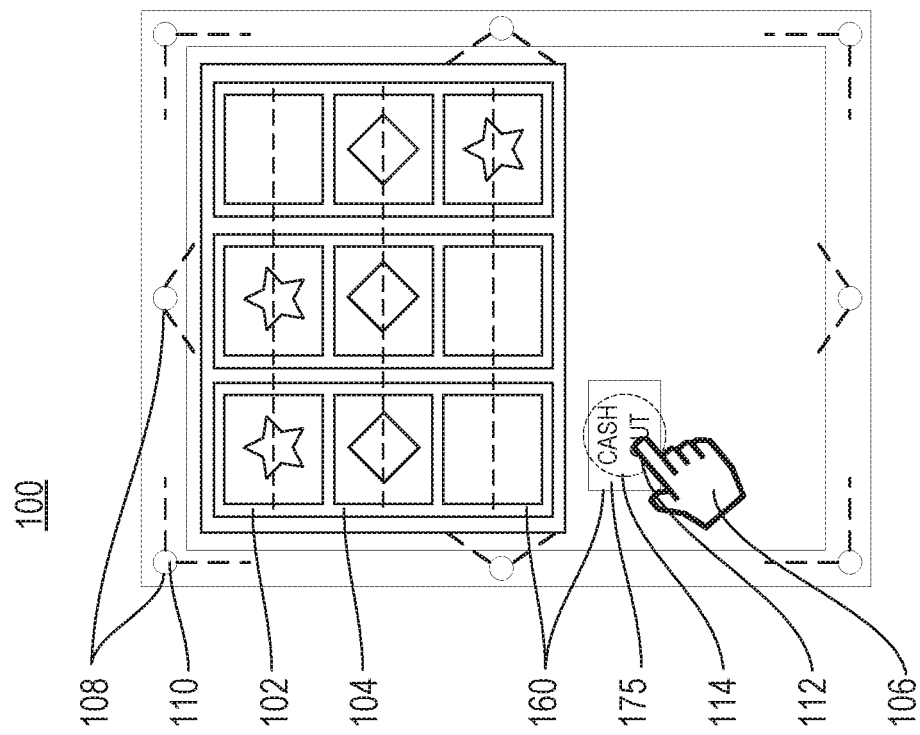

Many different user interface modifications based on different gesture input and predicted touch inputs. In this regard, FIGS. 5A and 5B are diagrams illustrating operation of the gesture input devices 108 and touch input devices 102 of the gaming device 100 of FIGS. 4A-4D to display a message to a player before activating a cashout function, according to some embodiments. In this embodiment, as shown by FIG. 5A, the processor circuit of the gaming device 100 or other device predicts touch inputs to be performed by the user 106 based on the gesture input values, predicts that the user's finger 112 will perform a touch input at a predicted location 114, and generates a predicted touch input value corresponding to the predicted touch input.

In this example, the predicted location 114 corresponds to a cashout function 175 for the gaming device 100. As shown by FIG. 5B, before the user 106 performs the predicted touch input, i.e., activates the cashout function 175, a graphical user interface element 160 may be modified to display an offer message 178 to the user 106 on the touchscreen 104 or another display device. The offer message 178 may attempt to persuade the user 106 to continue playing and not to activate the cashout function 175, for example by offering a benefit 180 to the user 106.

Figure 6B:
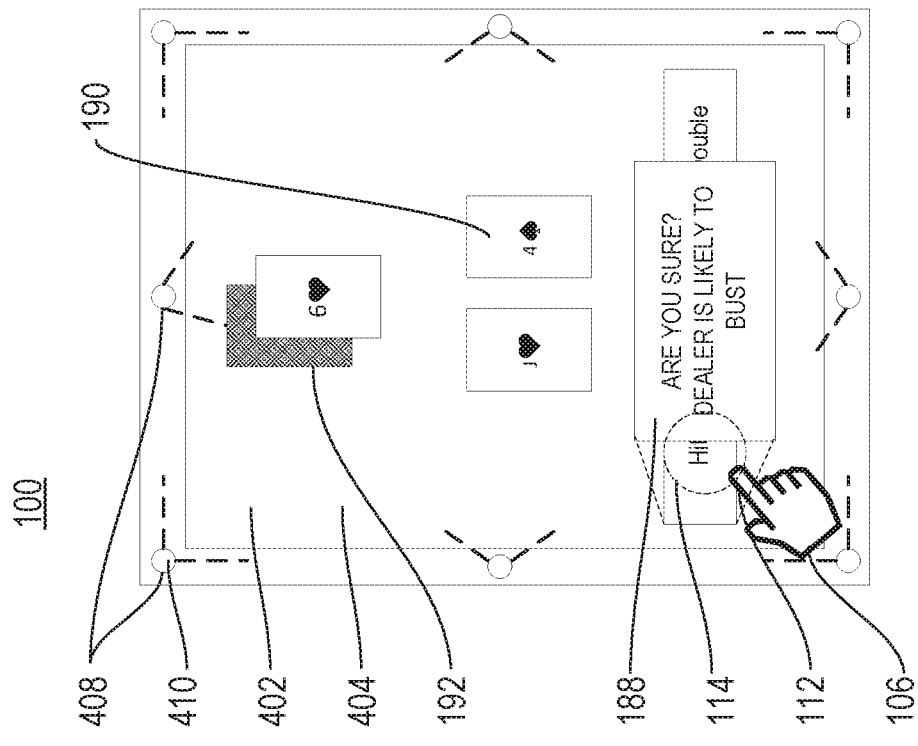
FIGS. 6A and 6B are diagrams illustrating operation of the gesture and touch input devices of FIGS. 4A-4D to display a game hint, according to some embodiments.
Figure 6A:
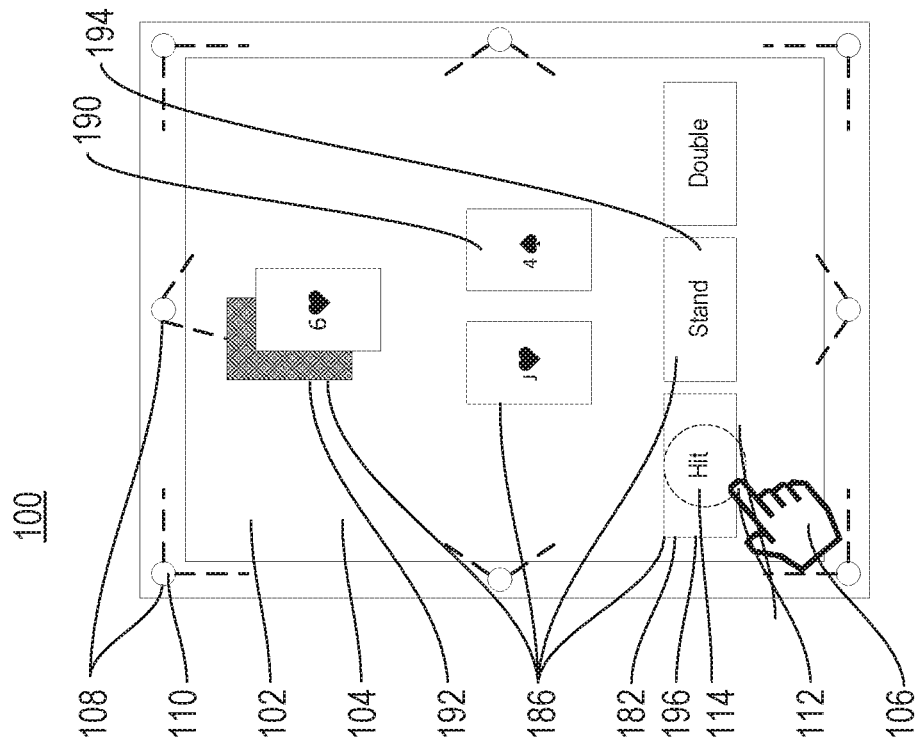

FIGS. 6A and 6B are diagrams illustrating operation of the gesture input devices 108 and touch input devices 102 of the gaming device 100 of FIGS. 4A-4D to display a game hint, according to some embodiments. As shown by FIG. 6A, the processor circuit of the gaming device 100 or other device predicts touch inputs to be performed by the user 106 based on the gesture input values, predicts that the user's finger 112 will perform a touch input at a predicted location 114, and generates a predicted touch input value corresponding to the predicted touch input.

In this example, the predicted location 114 corresponds to an incorrect or suboptimal game element 182 in a wagering game (e.g., a blackjack game). The wagering game may include a plurality of game elements 186, some of which may be selected by the user 106 to generate a game result. As shown by FIG. 6B, before the user 106 performs the predicted touch input, e.g., selects an incorrect or suboptimal game element 182 that would cause an unfavorable game result, a graphical user interface element 160 may be modified to display a hint 188 to the user 106 on the touchscreen 104 or another display device.

In this example, the wagering game 184 is a blackjack game in which the user 106 has been dealt a player hand 190 worth fourteen and a dealer hand 192 shows a six. According to basic strategy for blackjack, the correct action is to activate a stand function 194 and give the dealer hand 192 an opportunity to bust. As shown by FIG. 6B, in response to determining that the predicted location 114 is the hit function 196 (which would cause the player hand 190 to draw another card and likely bust), the hint 188 may display the likelihood of success for the predicted touch input (i.e., the hit function 196) and other touch inputs (i.e., the stand function 194), to persuade the user 106 to select the correct or optimal stand function 194 and not to select the incorrect or suboptimal hit function 194.

Figure 7B:
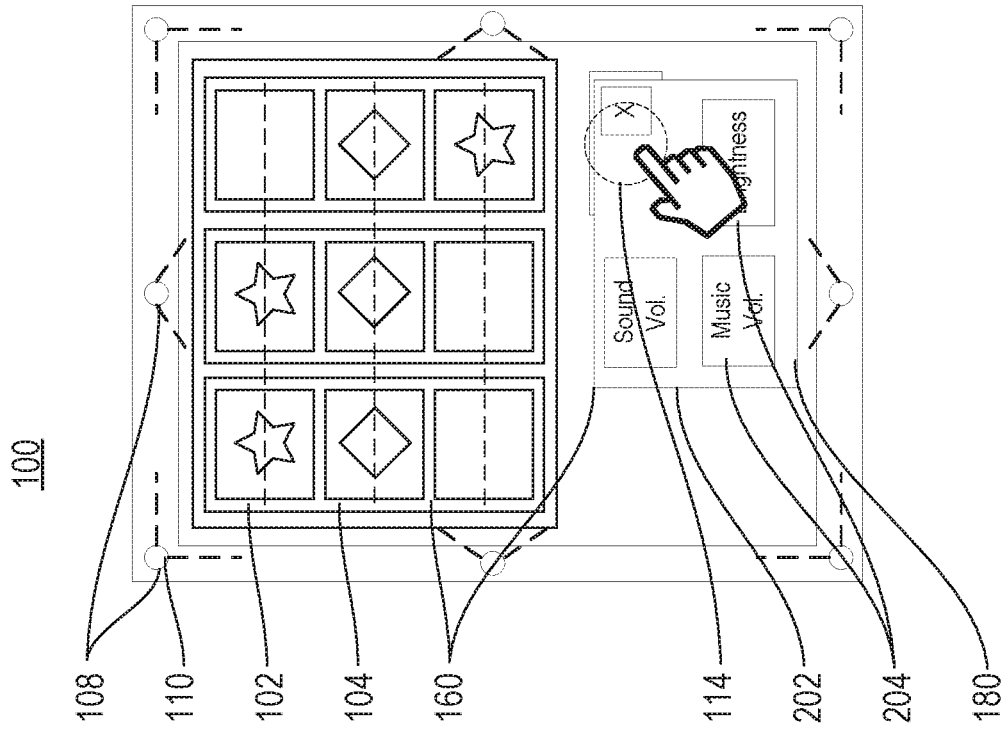
FIGS. 7A and 7B are diagrams illustrating operation of the gesture and touch input devices of FIGS. 4A-4D to display a plurality of available options, according to some embodiments.
Figure 7A:
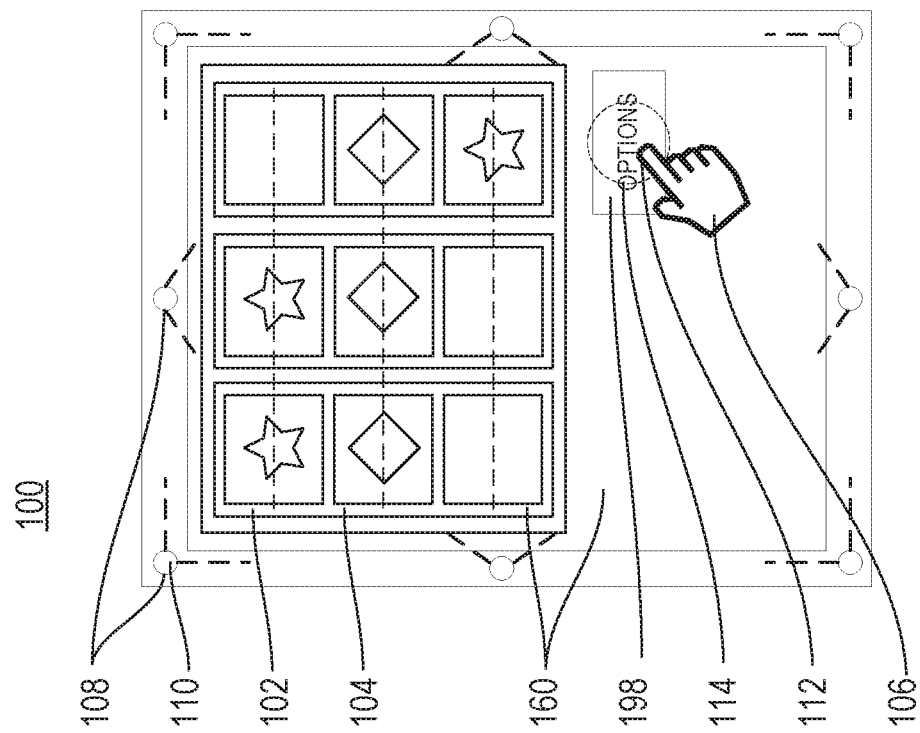

FIGS. 7A and 7B are diagrams illustrating operation of the gesture input devices 108 and touch input devices 102 of the gaming device 100 of FIGS. 4A-4D to display options associated with the gaming device 100, according to some embodiments. As shown by FIG. 7A, the processor circuit of the gaming device 100 or other device predicts touch inputs to be performed by the user 106 based on the gesture input values, predicts that the user's finger 112 will perform a touch input at a predicted location 114, and generates a predicted touch input value corresponding to the predicted touch input.

In this example, the predicted location 114 corresponds to an options function 198 for the gaming device 100. As shown by FIG. 7B, before the user 106 performs the predicted touch input, e.g., selects the options function 198 via the touchscreen 104, a graphical user interface element 160 may be modified to display a preview window 202 including a plurality of available settings 204. For example, the available settings 204 may include some or all of the settings for the gaming device 100, such as the most frequently used settings and/or preferred settings for the particular user 106.

Figure 8B:
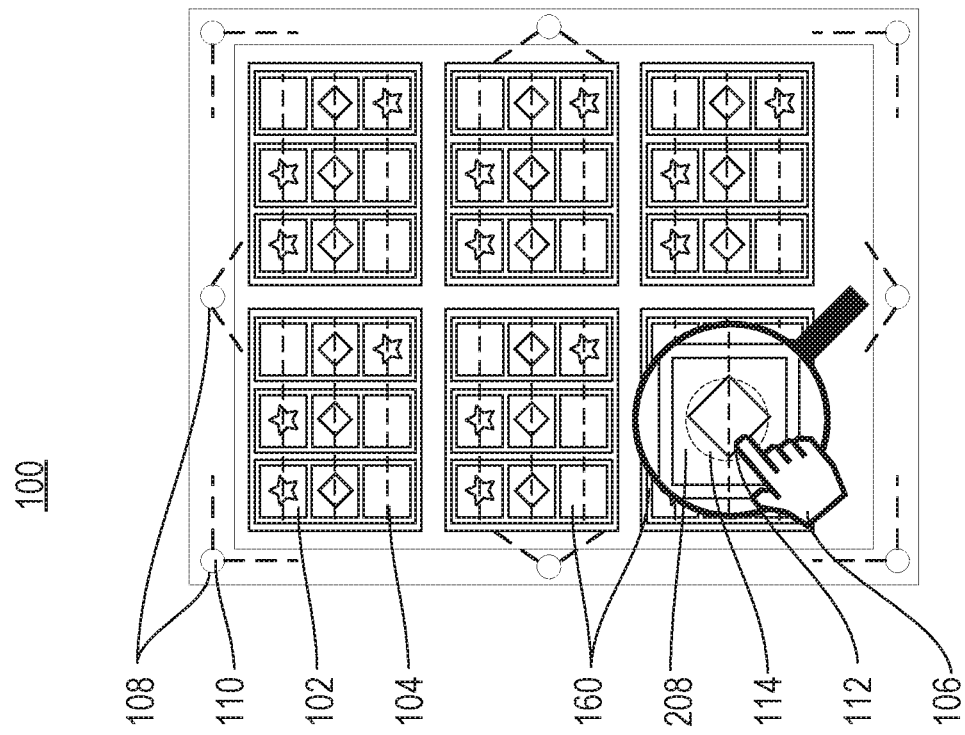
FIGS. 8A and 8B are diagrams illustrating operation of the gesture and touch input devices of FIGS. 4A-4D to magnify a portion of the display, according to some embodiments.
Figure 8A:
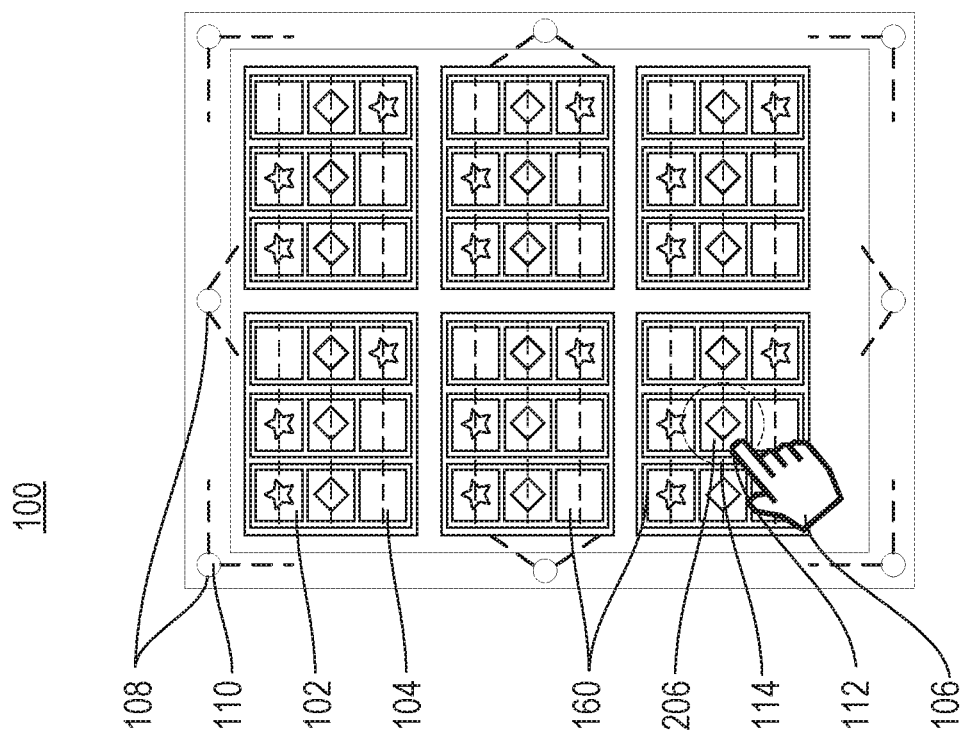

FIGS. 8A and 8B are diagrams illustrating operation of the gesture input devices 108 and touch input devices 102 of the gaming device 100 of FIGS. 4A-4D to magnify a portion 206 of the touchscreen 104 or other display, according to some embodiments. As shown by FIG. 8A, the processor circuit of the gaming device 100 or other device predicts touch inputs to be performed by the user 106 based on the gesture input values, predicts that the user's finger 112 will perform a touch input at a predicted location 114, and generates a predicted touch input value corresponding to the predicted touch input.

In this example, as shown in FIG. 8B, before the user 106 performs the predicted touch input, a graphical user interface element 160 (i.e., a portion 206 of the user interface around the predicted location 114) may be modified to magnify the graphical user interface element 160, i.e., generate and display a magnified portion 208 on the portion 206 of the user interface element 160 being displayed on the touchscreen 104, to aid the user 106 in viewing and/or interacting with the touchscreen 104.

Figure 9B:
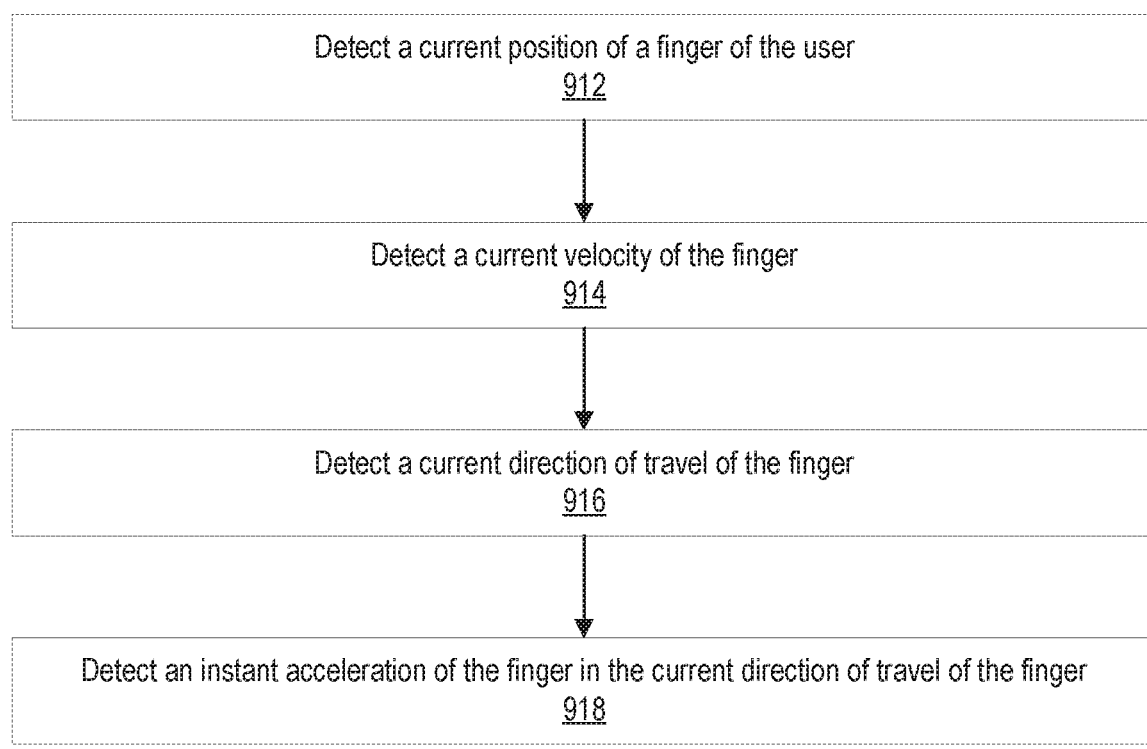
Figure 9C:
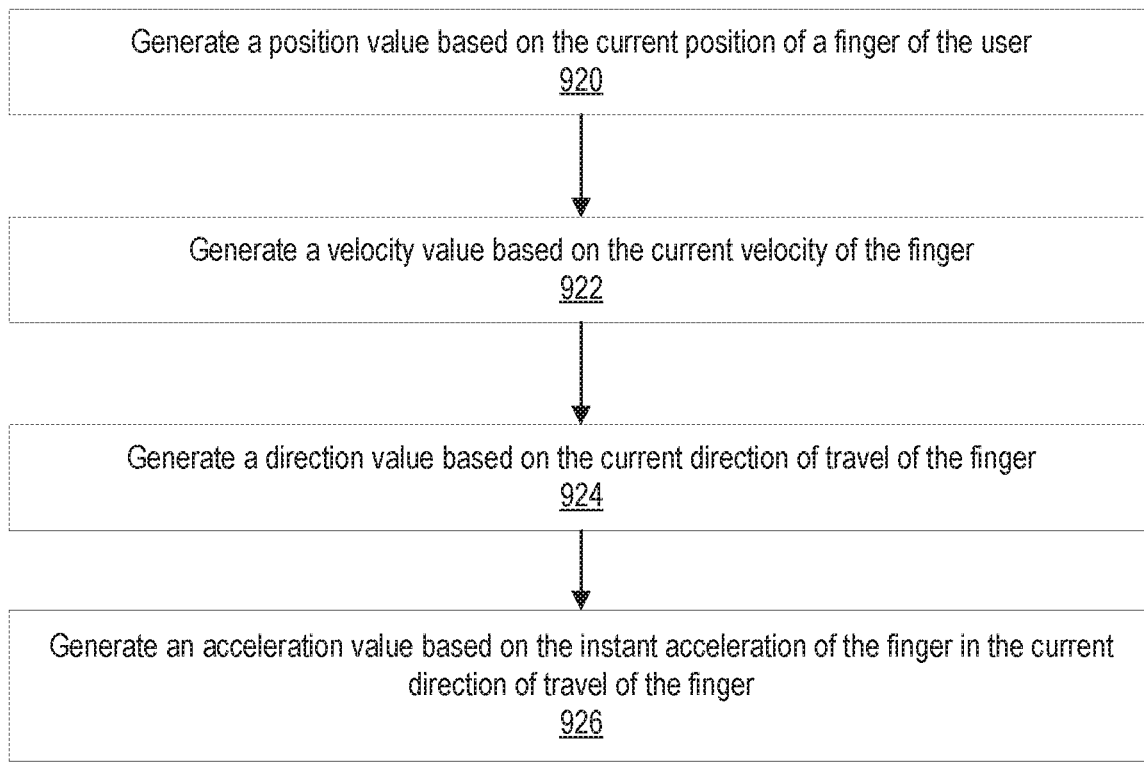

The embodiments described herein may operate in many different ways. In this regard, FIGS. 9A-9C are flowcharts illustrating operations 900 of systems/methods according to some embodiments. Referring now to FIG. 9A, operations 900 may include detecting, by a gesture input device of a gaming device, a first gesture by a user of the gaming device (Block 902). The operations 900 may further include generating, by the gesture input device, a first gesture input value based on the first gesture (Block 904). The operations 900 may further include based on the first gesture input value, predicting, by a processor circuit of the gaming device, a predicted touch input that is predicted to be performed by the user (Block 906). The operations 900 may further include generating, by the processor circuit, a predicted touch input value based on the predicted touch input (Block 908). The operations 900 may further include (Block 910). The operations 900 may further include modifying a user interface element of the gaming device based on the first gesture input value and the predicted touch input value.

Referring now to FIG. 9B, detecting the first gesture (Block 902) may further include detecting a current position of a finger of the user (Block 912), detecting a current velocity of the finger (Block 914), detecting a current direction of travel of the finger (Block 916), and/or detecting an instant acceleration of the finger in the current direction of travel of the finger (Block 918). As shown by FIG. 9C, generating the first gesture input value (Block 904) may further include generating a position value based on the current position of the finger of the user (Block 920), generating a velocity value based on the current velocity of the finger (Block 922), generating a direction value based on the current direction of travel of the finger (Block 924), and/or generating an acceleration value based on the instant acceleration of the finger in the current direction of travel of the finger (Block 926).

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:
   a touch input device to detect touch inputs performed by a user;
   a gesture input device to detect gesture inputs performed by the user;
   a processor circuit; and
   a memory coupled to the processor circuit, the memory comprising machine-readable instructions that, when executed by the processor circuit, cause the processor circuit to:
   receive a first gesture input value from the gesture input device;
   predict, based on the first gesture input value, a predicted touch input value corresponding to a predicted touch input that is predicted to be performed by the user; and
   modify a user interface element of the gaming device based on the first gesture input value and the predicted touch input value before the user performs the predicted touch input to encourage the user to not perform the predicted touch input.

2. The gaming device of claim 1, wherein the first gesture input value comprises a plurality of position values corresponding to a plurality of positions of a finger of the user, and
   wherein the instructions that cause the processor circuit to predict the predicted touch input value further cause the processor circuit to predict the predicted touch input value further based on the plurality of position values.

3. The gaming device of claim 2, wherein the instructions that cause the processor circuit to predict the predicted touch input value further cause the processor circuit to:
   determine, based on the plurality of position values, a velocity value corresponding to a current velocity of the finger of the user in a first direction; and
   further determine the predicted touch input value further based on the velocity value.

4. The gaming device of claim 2, wherein the first gesture input value further comprises:
   an acceleration value, determined based on the plurality of position values, corresponding to a current velocity of the finger of the user in a first direction, wherein the predicted touch input value is further based on the acceleration value.

5. The gaming device of claim 1, wherein the instructions that cause the processor circuit to predict the predicted touch input value further cause the processor circuit to:
   predict the predicted touch input value further based on a previously received touch input.

6. The gaming device of claim 1, wherein the instructions further cause the processor circuit to:
   in response to the user performing the predicted touch input, further modify the user interface element based on the first gesture input value and the predicted touch input value.

7. The gaming device of claim 1, wherein the instructions further cause the processor circuit to:
   in response to the user performing a different touch input that is different from the predicted touch input, further modify the user interface element based on the first gesture input value and the predicted touch input value.

8. The gaming device of claim 1, wherein the predicted touch input comprises a selection of a graphical user interface element, and
   wherein the instructions that cause the processor circuit to modify the user interface element further cause the processor circuit to:
   before the user performs the predicted touch input, modify the graphical user interface element to draw the user's attention to the graphical user interface element.

9. The gaming device of claim 8, wherein the instructions that cause the processor circuit to modify the user interface element further cause the processor circuit to:
   before the user performs the predicted touch input, modify an audio user interface element associated with the graphical user interface element.

10. The gaming device of claim 8, wherein the instructions that cause the processor circuit to modify the user interface element further cause the processor circuit to:
    before the user performs the predicted touch input, modify a haptic user interface element associated with the graphical user interface element.

11. The gaming device of claim 1, wherein the predicted touch input comprises a selection of a video program, and
    wherein the instructions that cause the processor circuit to modify the user interface element further cause the processor circuit to:
    before the user performs the predicted touch input, display a video preview of the video program.

12. The gaming device of claim 1, wherein the predicted touch input comprises initiating a cashout operation, and
    wherein the instructions that cause the processor circuit to modify the user interface element further cause the processor circuit to:
    before the user performs the predicted touch input, display an offer message to the user.

13. The gaming device of claim 1, wherein the predicted touch input comprises selecting a game element, and
    wherein the instructions that cause the processor circuit to modify the user interface element further cause the processor circuit to:
    before the user performs the predicted touch input, modify the user interface element to provide, to the user, a hint associated with selecting the game element.

14. The gaming device of claim 1, wherein the predicted touch input comprises selecting a settings element, and
    wherein the instructions that cause the processor circuit to modify the user interface element further cause the processor circuit to:
    before the user performs the predicted touch input, modify the user interface element to display a plurality of available settings.

15. The gaming device of claim 1, wherein the predicted touch input comprises selecting a graphical user interface element, and
    wherein the instructions that cause the processor circuit to modify the user interface element further cause the processor circuit to:
    before the user performs the predicted touch input, modify the user interface element to magnify the graphical user interface element.

16. The gaming device of claim 1, wherein the user interface element of the gaming device that is modified to encourage the user to perform an action other than the predicted touch input is different from a user interface element associated with the predicted touch input.

17. A method comprising:
- detecting, by a gesture input device of a gaming device, a first gesture by a user of the gaming device;
- generating, by the gesture input device, a first gesture input value based on the first gesture, the first gesture input value comprising a velocity value corresponding to a current velocity of the gesture;
- based on the velocity value, predicting, by a processor circuit of the gaming device, a predicted touch input that is predicted to be performed by the user;
- generating, by the processor circuit, a predicted touch input value based on the predicted touch input; and
- modifying a user interface element of the gaming device based on the first gesture input value and the predicted touch input value.

18. The method of claim 17 wherein detecting the first gesture comprises:
- detecting a plurality of positions of a finger of the user at a plurality of times; wherein generating the first gesture input value further comprises:
- generating a plurality of position values based on the plurality of positions of the finger of the user; and
- generating the velocity value based on the plurality of position values.

19. A system comprising
- a processor circuit; and
- a memory coupled to the processor circuit, the memory comprising machine-readable instructions that, when executed by the processor circuit:
- cause a gesture input device of a gaming device to:
  - detect a first gesture by a user of the gaming device; and
  - generate a first gesture input value based on the first gesture;
- cause the processor circuit to:
  - receive the first gesture input value from the gesture input device;
  - predict, based on the first gesture input value, a predicted touch input value corresponding to a predicted touch input that is predicted to be performed by the user; and
  - modify a user interface element of the gaming device based on the first gesture input value and the predicted touch input value to encourage the user to perform an action other than the predicted touch input before the user performs the predicted touch input.

20. The system of claim 19, wherein the first gesture input value comprises a plurality of position values corresponding to a plurality of positions of a finger of the user, and
wherein the instructions that cause the processor circuit to predict the predicted touch input value further cause the processor circuit to predict the predicted touch input value further based on the plurality of position values.

* * * * *